United States Patent

[11] 3,588,562

[72] Inventor Finn Dahlstrom
 Scotia, N.Y.
[21] Appl. No. 2,882
[22] Filed Jan. 14, 1970
[45] Patented June 28, 1971
[73] Assignee General Electric Company

[54] INSULATED SHAFT ATTACHMENT FOR ROTATING CONDUCTING RING
 2 Claims, 2 Drawing Figs.
[52] U.S. Cl. ............................................. 310/232
[51] Int. Cl. ........................................... H01r 39/08
[50] Field of Search ............................................. 310/70, 68, 178, 219, 227, 232

[56] References Cited
UNITED STATES PATENTS

| | | | |
|---|---|---|---|
| 996,266 | 6/1911 | Lord................................ | 310/227X |
| 3,014,193 | 12/1961 | Schiller........................... | 310/232X |
| 3,444,408 | 5/1969 | Krulls............................. | 310/227 |

Primary Examiner—Milton O. Hirshfield
Assistant Examiner—Mark O. Budd
Attorneys—W. C. Crutcher, Frank L. Neuhauser, Oscar B. Waddell and Joseph B. Forman ABSTRACT: A construction for attaching an electrically conductive ring member, such as a dynamoelectric machine collector ring, to a shaft which is surrounded by a protected insulating sheath. Radially expandible members between the ring and the sheath serve to tighten the ring against a load-distributing intermediate sleeve which surrounds the protected insulated sheath.

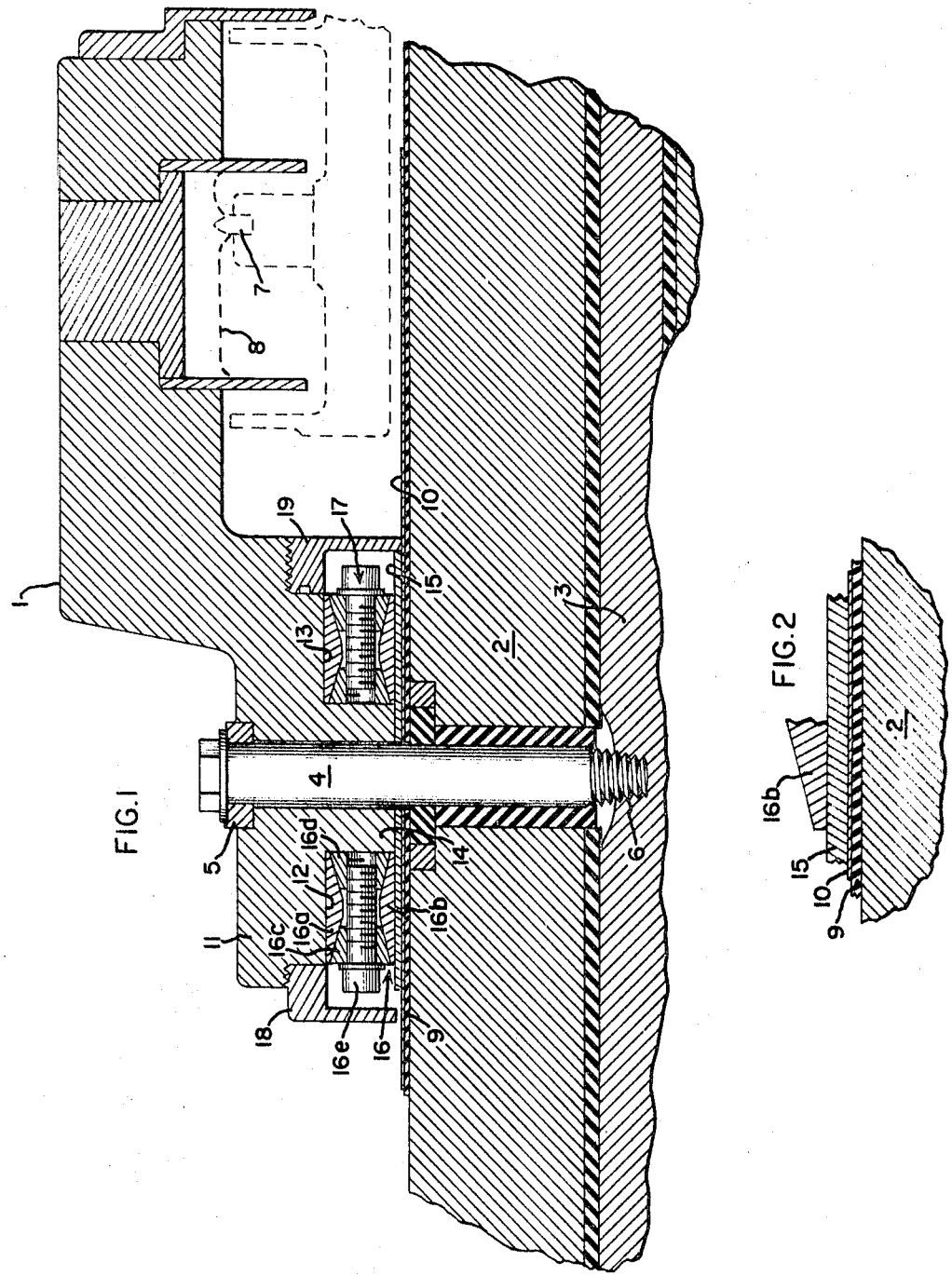
INVENTOR:
FINN DAHLSTROM,
BY W. C. Crutcher
HIS ATTORNEY.

INSULATED SHAFT ATTACHMENT FOR ROTATING CONDUCTING RING

BACKGROUND OF THE INVENTION

In dynamoelectric machines, it is usually necessary to conduct current to and from the rotating shaft via a conductive ring member which is insulated from the shaft. In large generators, the collector rings which transmit DC excitation current to the rotating field windings, have generally been applied to the shaft with a shrink fit on top of an insulating sheath around the shaft, and current carried by means of insulated radial studs fastened to insulated conductors in the shaft bore hole.

In several newer proposals for cooling such collector rings, as exemplified in U.S. Pat. No. 3,444,408 of Krulls, or copending application Ser. No. 876,866 filed in the names of Barton et al. on Nov. 14, 1969, evaporative cooling techniques are employed which expose the normal insulation to vapor which could damage or destroy the insulation.

One suggestion for protecting the insulation is to employ a protective thin metal sheath, However, when attempting to shrink a heavy ring to a thin metal sheath which has previously been shrunk over a shaft member, it will be found that it is impossible to keep the thin sheath from immediately assuming the temperature of the heated ring and expanding to become locked to it as soon as the two are in proximity to one another.

Accordingly, one object of the present invention is to provide an improved insulated shaft attachment for a conducting ring disposed on a shaft member where the insulation must be protected.

Another object of the invention is an improved method for attaching a conductive ring to an insulated shaft having a thin protective metal sheath over the insulation.

DRAWING

The subject matter which is regarded as the invention is particularly pointed out and distinctly claimed in the concluding portion of the specification. The invention, however, both as to organization and method of practice, together with further objects and advantages thereof, may best be understood by reference to the following description, taken in connection with the accompanying drawing in which:

FIG. 1 is a cross-sectional elevation view taken through a collection ring and a portion of the dynamoelectric machine shaft, and FIG. 2 is an enlarged cross-sectional view between the shaft and collector ring.

SUMMARY OF THE INVENTION

Briefly stated, the invention comprises a method and construction for attaching a collector ring to a shaft surrounded by an insulating sheath and a thin protective metal sheath by means of expandible members located in recesses in the ring: The expandible members constrict an intermediate load-distributing sleeve around the protective metal sheath when the members are expanded radially.

DESCRIPTION OF THE PREFERRED EMBODIMENT

Referring now to FIG. 1 of the drawing, an electrically conductive collector ring member 1 id disposed upon a rotatable shaft, a portion of which is indicated at 2. Electrical current is conducted to axial conductors 3 disposed in the borehole on the centerline of the shaft by means of radial studs 4. Studs 4 form an electrical contact at the outer end through washer 5 and at the inner end through threads 6, but do not serve to carry any mechanical load to fix the ring 1 to the shaft.

Collector ring 1, as indicated in the drawing, is of the liquid metal collector type as set forth in the aforementioned Krulls patent and current is transmitted to rotating ring 1 via a stationary blade 7 forming contact with a rotating pool of liquid metal 8. However, the ring 1 could equally well be a conventional brush-type collector with common brushes disposed in rubbing relation with the outer periphery of ring 1, these details being not material to the present invention.

In order to insulate the ring from the shaft, a glass reinforced Epoxy insulating sheath 9 is shrunk over the shaft in accordance with conventional practice. However, in order to protect the insulation sheath 9 from possible corrosive effects of vapor in the collector or other environmental conditions, a thin stainless steel sheath 10 is shrunk over the insulating sleeve 9. A 20 mil stainless steel sheath has been found to be satisfactory.

Referring to the construction of the collection ring 1, a hub portion 11 defines a pair of annular recesses 12, 13 on either side of a central hub portion 14. Between the hub 11 and the shaft 2, is an intermediate load-distributing sleeve 15. Sleeve 15 is of substantially greater thickness than metal sheath 10. A ⅛-inch thick sleeve gives suitable results.

In each of the annular recesses 12, 13, there are disposed expandible ring assemblies 16, 17 respectively of a known type. These or similar expandible ring assemblies are commercially available, a suitable assembly being available from RINGFEDER Gmbh, Krefeld-Uerdingen, West Germany. Briefly, the elements of the locking assembly comprise an outer double wedge-shaped ring 16a, an inner double wedge-shaped ring 16b, and a pair of additional axially spaced wedge-shaped rings 16c, 16d which are constrictable toward one another by means of a ring of bolts 16e. Protecting rings 18, 19 are threaded into either end of the hub 11 to cover the bolts 16e.

Reference to FIG. 2 of the drawing illustrates the relative position and size of the various layers in greater detail. The force exerted on the sleeve 15 is transmitted both longitudinally and radially so that the much thinner sleeve 10 in squeezed uniformly and the insulation is not damaged.

OPERATION

The method of attaching the collector ring is as follows. The glass Epoxy insulation 9 is shrunk to the shaft, and then the stainless steel protective sheath 10 is shrunk to the insulating sheath. Next, the assembly comprising the intermediate sleeve 15, expandible ring assembly 16, 17 and the collector ring itself are put in place. The locking assemblies 16, 17 are expanded by means of the bolts 16e until the collector ring is securely locked to the shaft, with the intermediate load-distributing sleeve 15 serving to uniformly distribute the load on the protective sheath and the insulation so as not to damage it. Finally, the protective rings 18, 19 are applied to complete the assembly.

The aforementioned method and construction for attaching a collector ring to an insulated shaft provides a way to attach a ring over the thin protective metal sheath when conventional shrink fit procedures will not suffice. Excellent locking is obtained without damage of the insulation.

While there has been described herein what is considered to be the preferred embodiment of the invention, other modifications will occur to those skilled in the art, and it is intended to cover in the appended claims all such modifications as fall within the true spirit and scope of the invention.

I claim:

1. In a dynamoelectric machine, the combination of
   a rotatable shaft portion,
   an insulating sheath tightly engaging and surrounding the shaft portion,
   a thin metal protective sheath tightly engaging and surrounding said insulating sheath,
   an intermediate load-distributing sleeve surrounding said protective sheath,
   an electrical conductive ring member having a hub portion surrounding said intermediate sleeve and further defining at least one annular recess together with said intermediate sleeve, and
   a radially expandible ring assembly disposed in said recess between the ring and the intermediate sleeve surrounding the shaft portion and expanded to lock said ring to said intermediate sleeve and to constrict it about said shaft.

2. The combination according to claim 1, wherein said insulating sheath is a glass-reinforced Epoxy material, wherein said protective sheath is a stainless steel sheath on the order of 20 mils thickness, and wherein said intermediate sleeve is of substantially greater thickness than said protective sheath.